(12) United States Patent
Pendar

(10) Patent No.: US 11,403,331 B2
(45) Date of Patent: *Aug. 2, 2022

(54) MULTI-TERM QUERY SUBSUMPTION FOR DOCUMENT CLASSIFICATION

(71) Applicant: GROUPON, INC., Chicago, IL (US)

(72) Inventor: Nick Pendar, San Ramon, CA (US)

(73) Assignee: Groupon, Inc., Chicago, IL (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/910,290

(22) Filed: Jun. 24, 2020

(65) Prior Publication Data

US 2020/0394211 A1   Dec. 17, 2020

Related U.S. Application Data

(63) Continuation of application No. 15/482,179, filed on Apr. 7, 2017, now Pat. No. 10,726,055, which is a continuation of application No. 15/198,461, filed on Jun. 30, 2016, now Pat. No. 9,652,527, which is a
(Continued)

(51) Int. Cl.
*G06F 16/332* (2019.01)
*G06F 16/35* (2019.01)
*G06F 16/93* (2019.01)
*G06N 20/00* (2019.01)

(52) U.S. Cl.
CPC .......... *G06F 16/3322* (2019.01); *G06F 16/35* (2019.01); *G06F 16/93* (2019.01); *G06N 20/00* (2019.01)

(58) Field of Classification Search
CPC .......... G06F 17/30707; G06F 17/2795; G06F 17/30424; G06F 17/30598; G06F 17/3064; G06F 17/30672; G06F 17/30864; G06F 16/3322; G06F 16/35; G06F 16/93; G06N 99/005; G06N 20/00
See application file for complete search history.

(56) References Cited

U.S. PATENT DOCUMENTS 4,868,733 A * 9/1989 Fujisawa ............... G06T 11/206
6,233,575 B1 * 5/2001 Agrawal ............... G06F 16/355
(Continued)

OTHER PUBLICATIONS

Prohaska, "Building Web Query Subsumption Hierarchies" (Master's Thesis), Saarland University, (Aug. 1, 2008).
(Continued)

*Primary Examiner* — Dennis Truong
(74) *Attorney, Agent, or Firm* — Alston & Bird LLP

(57) ABSTRACT

In general, embodiments of the present invention provide systems, methods and computer readable media for generating an optimal classifying query set for categorizing and/or labeling textual data based on a query subsumption calculus to determine, given two queries, whether one of the queries subsumes another. In one aspect, a method includes generating a group of determining queries based on analyzing text within a document; receiving a group of classifying queries; and, for each determining query within the group of determining queries, determining whether at least one of the classifying queries is subsumed by the determining query; and updating the group of classifying queries in an instance in which the classifying query is subsumed by the determining query.

20 Claims, 5 Drawing Sheets

Related U.S. Application Data continuation of application No. 14/038,644, filed on Sep. 26, 2013, now Pat. No. 9,411,905.

(56) References Cited

U.S. PATENT DOCUMENTS

| | | | | |
|---|---|---|---|---|
| 6,513,027 B1* | 1/2003 | Powers | ............... | G06F 16/355 |
| | | | | 706/47 |
| 6,519,592 B1* | 2/2003 | Getchius | ............... | G06Q 30/00 |
| 7,162,413 B1* | 1/2007 | Johnson | ............... | G06F 16/345 |
| | | | | 704/9 |
| 7,398,196 B1* | 7/2008 | Liu | ............... | G06F 17/2745 |
| | | | | 704/1 |
| 7,925,498 B1* | 4/2011 | Baker | ............... | G06F 16/3338 |
| | | | | 704/9 |
| 8,620,909 B1 | 12/2013 | Rennison | | |
| 8,918,395 B2 | 12/2014 | Gehrking et al. | | |
| 9,330,167 B1 | 5/2016 | Pendar | | |
| 9,411,905 B1* | 8/2016 | Pendar | ............... | G06F 16/3322 |
| 9,652,527 B2 | 5/2017 | Pendar | | |
| 2003/0050915 A1* | 3/2003 | Allemang | ............... | G06F 16/367 |
| 2003/0217335 A1* | 11/2003 | Chung | ............... | G06F 17/2785 |
| | | | | 715/206 |
| 2004/0059697 A1* | 3/2004 | Forman | ............... | G06K 9/6228 |
| | | | | 706/46 |
| 2005/0108001 A1* | 5/2005 | Aarskog | ............... | G06F 17/271 |
| | | | | 704/10 |
| 2006/0190439 A1* | 8/2006 | Chowdhury | ............... | G06F 16/353 |
| 2006/0235870 A1* | 10/2006 | Musgrove | ............... | G06F 16/367 |
| 2010/0174670 A1* | 7/2010 | Malik | ............... | G06F 16/35 |
| | | | | 706/12 |
| 2010/0293174 A1* | 11/2010 | Bennett | ............... | G06F 16/353 |
| | | | | 707/759 |
| 2011/0196879 A1* | 8/2011 | Robinson | ............... | G06Q 10/107 |
| | | | | 707/749 |
| 2011/0264699 A1* | 10/2011 | Antonelli | ............... | G06F 16/353 |
| 2012/0078873 A1* | 3/2012 | Ferrucci | ............... | G06F 16/3329 |
| | | | | 707/708 |
| 2012/0161940 A1* | 6/2012 | Taylor | ............... | G01D 21/00 |
| | | | | 340/10.3 |
| 2012/0259856 A1* | 10/2012 | Gehrking | ............... | G06F 16/24578 |
| | | | | 707/739 |
| 2013/0086024 A1* | 4/2013 | Liu | ............... | G06F 16/951 |
| | | | | 707/706 |
| 2013/0226935 A1* | 8/2013 | Bai | ............... | G06N 20/00 |
| | | | | 707/748 |

OTHER PUBLICATIONS

U.S. Appl. No. 15/482,179, filed Apr. 7, 2017, U.S. Pat. No. 10,726,055, Issued.

U.S. Appl. No. 15/198,461, filed Jun. 30, 2016, U.S. Pat. No. 9,652,527, Issued.

U.S. Appl. No. 14/038,644, filed Sep. 26, 2013, U.S. Pat. No. 9,411,905, Issued.

* cited by examiner

MULTI-TERM QUERY SUBSUMPTION FOR DOCUMENT CLASSIFICATION

CROSS-REFERENCE TO RELATED APPLICATIONS

This application is a continuation of and claims priority to U.S. application Ser. No. 15/482,179, titled "Multi-Term Query Subsumption For Document Classification," filed Apr. 7, 2017, which is a continuation of U.S. application Ser. No. 15/198,461, titled "Multi-Term Query Subsumption For Document Classification," filed Jun. 30, 2016 (now U.S. Pat. No. 9,652,527 issued May 16, 2017), which is a continuation of U.S. application Ser. No. 14/038,644, titled "Multi-Term Query Subsumption For Document Classification," filed Sep. 26, 2013 (now U.S. Pat. No. 9,411,905 issued Aug. 9, 2016), the contents of which are hereby incorporated herein by reference in their entirety.

FIELD

Embodiments of the invention relate, generally, to determining whether one query associated with a classification model subsumes (i.e., is more general than) another query associated with the model.

BACKGROUND

Current methods for selecting the best (i.e., the most general) queries to use as the basis for classifying textual documents exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for generating an optimal classifying query set for categorizing and/or labeling textual data based on a query subsumption calculus to determine, given two queries, whether one of the queries subsumes another.

In general, one aspect of the subject matter described in this specification can be embodied in systems, methods, and computer program products that include the actions of generating a group of determining queries based on analyzing text within a document; receiving a group of classifying queries; and, for each determining query within the group of determining queries, determining whether at least one of the classifying queries is subsumed by the determining query; and updating the group of classifying queries in an instance in which the classifying query is subsumed by the determining query.

These and other embodiments can optionally include one or more of the following features. The actions may further include not updating the group of classifying queries in an instance in which the query is subsumed by a classifying query. Updating the group of classifying queries may include the actions of adding the query to the group of classifying queries; and removing the classifying query from the group of classifying queries. Determining whether the classifying query is subsumed by the query may include the actions of calculating a first feature spread between a leftmost common term and a rightmost common term for the query; calculating a second feature spread between the leftmost common term and the rightmost common term for the classifying query; and determining that the classifying query is subsumed by the query in an instance in which the first feature spread is greater than or equal to the second feature spread. Calculating the first feature spread may include subtracting at least one outer omission from the query. Calculating the second feature spread may include subtracting at least one outer omission from the classifying query.

Each classifying query within the group of classifying queries is associated with a performance metric that indicates a level of performance of the classifying query for documents associated with a particular category, and the actions may further include identifying a subsuming subset of the group of classifying queries that each subsumes at least one of the determining queries; calculating a document categorization score based on the performance metrics respectively associated with each of the subsuming subset of classifying queries; and associating the document with the particular category associated with the group of classifying queries in an instance in which the document categorization score is greater than a categorization threshold value. The performance metric associated with each of the subsuming subset of classifying queries may be a binormal separation score.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
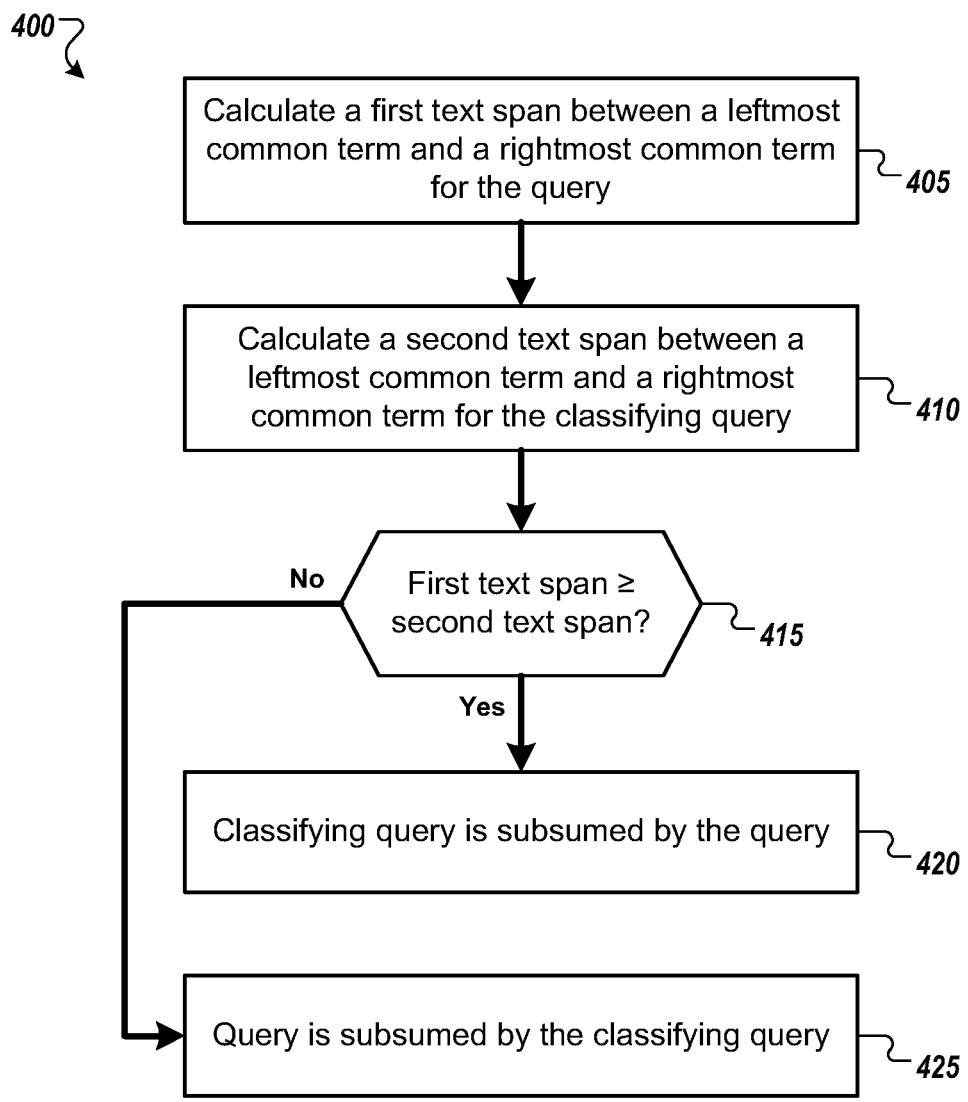
Figure 5:
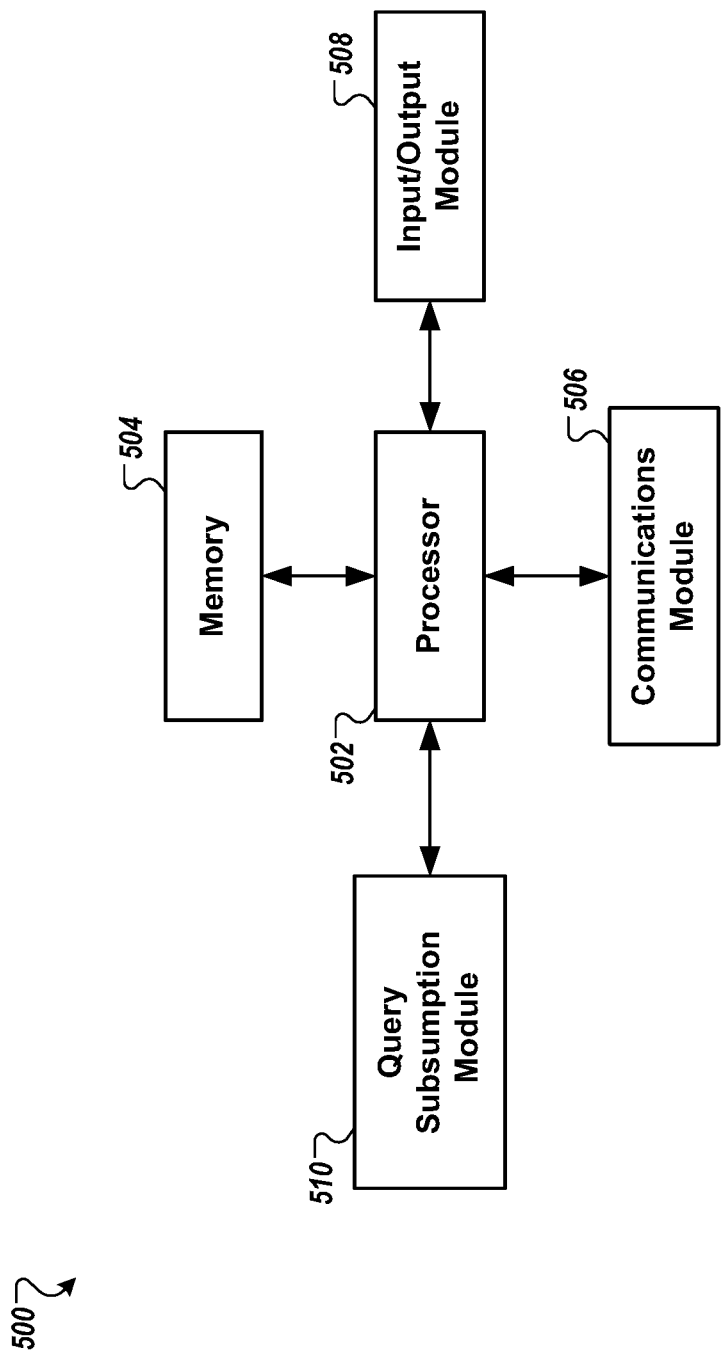

FIG. 4 is a flow diagram of an example method for determining whether a query subsumes a classifying query based in part on a query subsumption calculus in accordance with some embodiments discussed herein; and FIG. 5 illustrates a schematic block diagram of circuitry that can be included in a computing device, such as a query subsumption system, in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

A common technique for categorization and labeling of textual data is to apply sets of very specific queries that denote particular categories to the textual data. A set of queries is written for each potential category to which a given piece of text can be assigned, and the category associated with the set of queries that produces the highest number of hits after being applied to the piece of text is assigned to that text.

Traditionally, the queries that denote particular categories are produced manually (and perhaps tested) by domain experts. Manually writing precise queries is a tedious and difficult task for humans. To improve efficiency and reduce the chance for errors in the task, in some embodiments, such query sets can be inferred automatically given a set of manually labeled training data as described, for example, in U.S. patent application Ser. No. 13/893,044 entitled "Method, Apparatus, And Computer Program Product For Classification And Tagging Of Textual Data," filed on May 13, 2013, and which is incorporated herein in its entirety.

In some embodiments, query sets for categorization and labeling of textual data may be generated automatically using a supervised learning method. The training data sets used for the supervised learning method may be generated from examples of machine readable text that are each respectively assigned particular labels and/or categories. The output of the supervised learning method is sets of very precise queries and their associated weights; each query set is used to identify a distinct label or category. The automatically generated query sets can be used to categorize and/or label, previously unseen new data, as previously described.

Although automatically generating query sets for categorization (sets of classifying queries, hereinafter) improves efficiency and reduces errors, some problems may be encountered if the automatically generated classifying query sets are large. Running all the queries in a large classifying query set against each document to be categorized may be time and resource intensive, affecting overall system performance. Additionally, it is difficult to select the best (i.e., the most general) classifying queries from an automatically generated query set while ensuring that the selected query set does not result in the model over-fitting the training data set.

As such, and according to some example embodiments, the systems and methods described herein are therefore configured to apply methods for generating an optimal classifying query set for categorizing and/or labeling textual data based on a query subsumption calculus to determine, given two queries, whether one of the queries subsumes another. Query b would be determined to subsume query a if query b is a more general classifying query than query a and every document hit by query a is also going to be hit by query b.

Additionally and/or alternatively, in some embodiments, query subsumption methods may be used to reduce computation time for categorizing a document using sets of automatically generated classifying queries. Instead of running all queries in a set of classifying queries against the document to determine how many hits result, one set of queries (determining queries, hereinafter) automatically can be generated from the document, and the determining queries can be evaluated to determine whether they are subsumed by at least one of the queries in the classifying query set.

Figure 1:
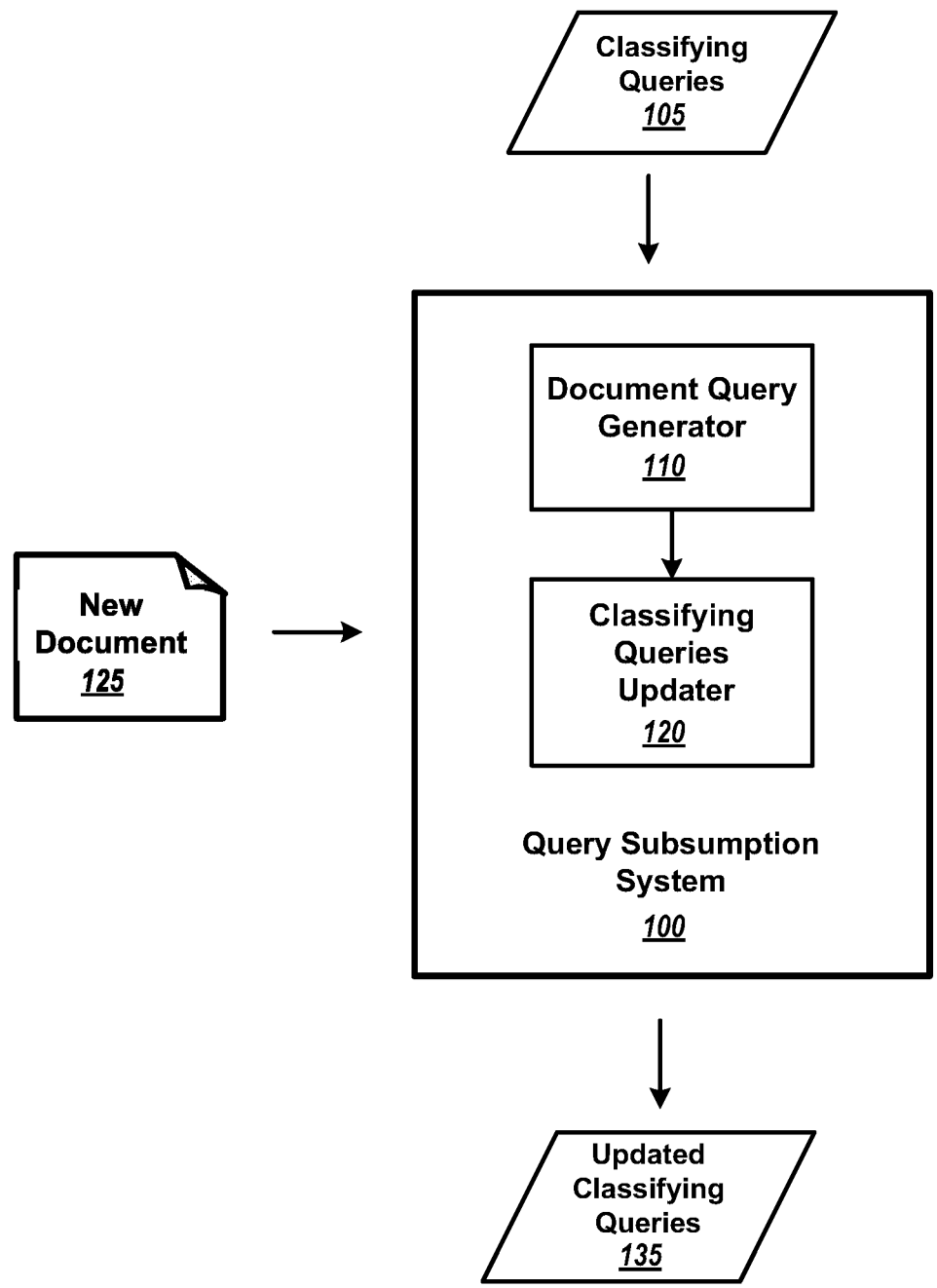
FIG. 1 illustrates an example embodiment of a query subsumption system that can be configured to receive a set of classifying queries, and then, in response to receiving a new text document, generate an updated set of classifying queries based on applying query subsumption calculus in accordance with some embodiments discussed herein.

FIG. 1 illustrates an example embodiment of a query subsumption system 100 that can be configured to receive a set of classifying queries 105 used to identify a particular label and/or category, and then, in response to receiving a new text document 125, generate an updated set of classifying queries 135 based on applying query subsumption calculus.

In embodiments, document query generator 110 generates a set of determining queries based on analyzing the text within the new document 125. In some embodiments, each sentence in the new document 125 may be analyzed to identify at least one of the words in a feature set of words that was derived during implementation of a supervised learning method as described in U.S. patent application Ser. No. 13/893,044. A set of determining queries that include the identified words may then be generated. In some embodiments, a maximum length may be specified for the queries to be generated. For example, if a maximum length of 3 is specified, 1, 2, and 3 word determining queries may be generated.

For example, "Come enjoy our delicious sandwiches" may be a sentence taken from the web site of a fast food restaurant that offers sandwiches, and a feature set of words for categorizing restaurants may include "enjoy" "delicious" and "sandwiches." Thus, assuming a maximum query length of 3 was specified, the 4 determining queries that may be generated from the exemplary sentence are "enjoy . . . sandwiches"; "enjoy . . . delicious sandwiches"; "delicious sandwiches"; and "sandwiches." The 2 and 3 word queries are multi-term queries.

In some embodiments, the set of determining queries automatically generated from the document 125 is filtered to include only the high precision queries. In some embodiments, a query is determined to be a high precision query if its precision is above a precision threshold (e.g., 95% precision). In some embodiments, the precision of a query can be measured by applying the query to a corpus of categorized documents and analyzing the hits returned. Referring to the example set of generated queries, the query "delicious sandwiches" may be applied to a corpus of 1000 documents that includes 100 documents categorized as restaurant documents. If hits on 95 of the 100 restaurant documents are returned, the query precision can be determined to be 95%. Additionally and/or alternatively, metrics measuring the performance of a query may include a measure of its recall. Again referring to the example set of generated queries, if the query "delicious sandwiches" is applied to a corpus containing 200 restaurant documents and only 100 hits are returned, the recall of the query is determined to be 50%.

In some embodiments, a query's performance is represented by a precision score. In some embodiments, a query is applied to a corpus that includes both positive and negative documents (i.e., positive documents that have been categorized as belonging to the category represented by the feature set and negative documents that have been categorized as belonging to a different category than the category represented by the feature set). In some embodiments, the performance score of a query can be calculated as a binormal separation score (BNS) that represents how well the query separates the positive documents from the negative documents in the corpus.

In embodiments, classifying queries updater 120 receives the set of determining queries generated from the document 125 and, for each of the multi-term queries, determines, by applying a query subsumption calculus, whether the determining query subsumes at least one of the classifying queries. In embodiments, the set of classifying queries 105 may be updated 135 and/or the document may be categorized based on the results of the determinations. Determination of whether a query subsumes another query and updating of a set of classifying queries will be discussed in more detail below with reference to FIG. 2 and FIG. 4.

Figure 2:
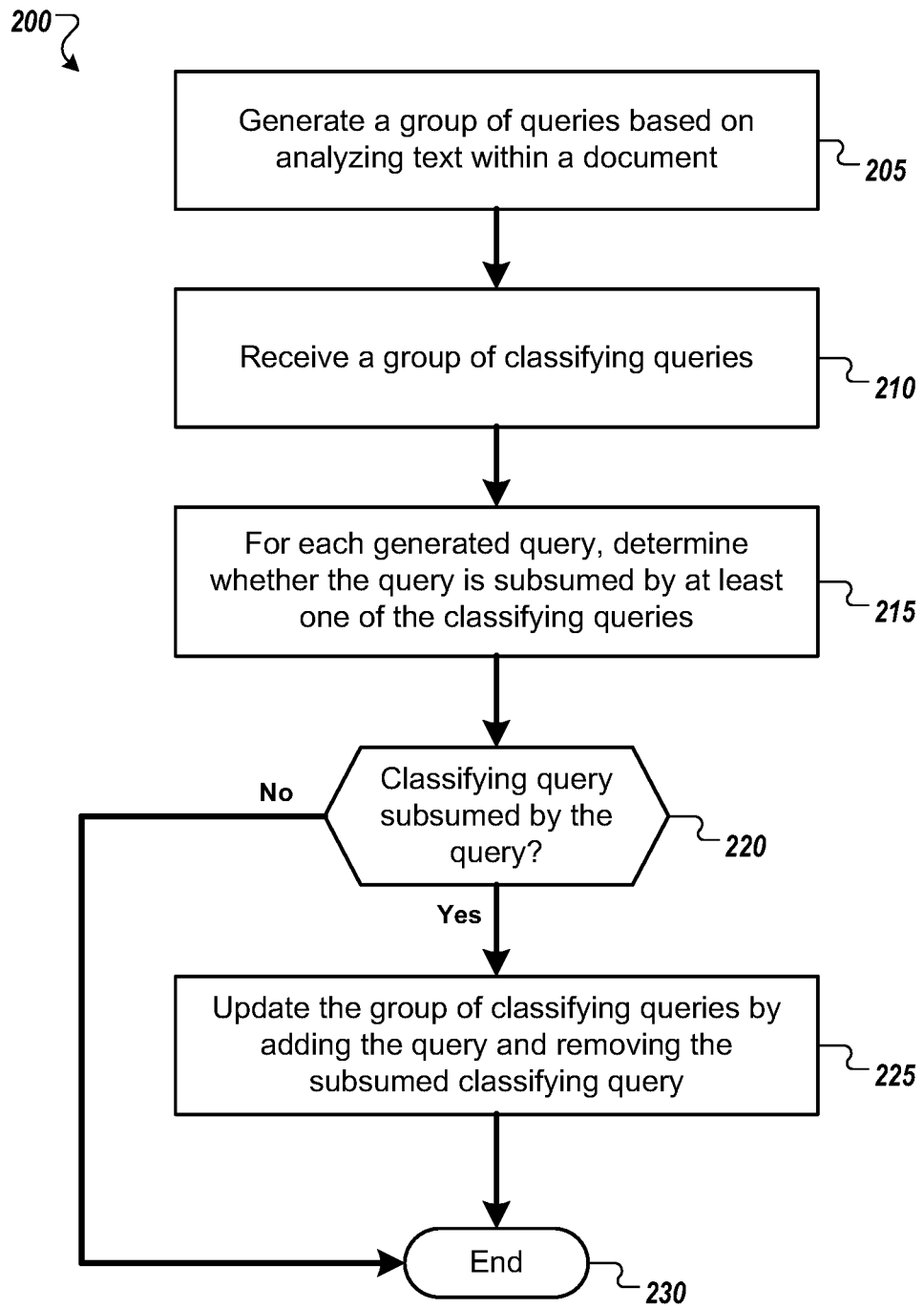
FIG. 2 is a flow diagram of an example method for updating a set of classifying queries based on determining whether a query generated from an input document subsumes at least one of the classifying queries in accordance with some embodiments discussed herein.

FIG. 2 is a flow diagram of an example method 200 for updating a set of classifying queries based on determining whether a query generated from an input document subsumes at least one of the classifying queries. For convenience, the method 200 will be described with respect to a system that includes one or more computing devices and performs the method 200. Specifically, the method 200 will be described with respect to processing of a new text document 125 by query subsumption system 100.

In embodiments, the system generates 205 a group of determining queries based on analyzing text within a document. In some embodiments, the group of determining queries is generated from the sentences in the document based on identifying words from a feature set of words, as described previously with reference to FIG. 1. In some embodiments, the group of determining queries is filtered to include the high precision queries, as described previously with reference to FIG. 1.

Let D be a corpus of documents. Feature set F consists of words selected from D to generate queries.

Term array t is an ordered list of features $f \in F$. Let $t_n$ be a term array of length n, and $t''_i$, where $i \leq n$, be the $i^{th}$ element in term array $t_n$. Also let $|t|$ denote the length of term array t. The relation $\prec$ defines a total order over $t_n$ such that for every $t''_i, t''_j$ where $i \neq j$ then either $t''_i \prec t''_j$ (i.e., $t''_i$ precedes $t''_j$, or vice versa. The inverse of $\prec$ is $\succ$.

The set of all t'' generated from F is denoted by T''.

Let $T := \cup T_n$ for all $n > 0$ be the union of all sets of all possible term arrays.

Term index is the token position of feature f in a given text segment. Let TS be the set of text segments generated from D. Term index is defined as index: $F \times TS \rightarrow Z$.

Query $q \in Q$ is a tuple (t'', g), where $g \in Z$ denotes the gap allowed between the indices of the first and last terms in t'' in a given text segment. Let score: $Q \rightarrow R$ be a score associated with q. For ease of reference, let terms($q_i$) and gap($q_i$) refer to t'' and g components in query $q_i$, respectively.

Let hit: $Q \rightarrow P(D)$ be a relation from the set of queries into the powerset of the corpus documents. Query q hits document d if there exists a text span in d that contains $t_1 \ldots t_n$ in terms(q) in order and gap(q)$\geq$index($t_n$, ts)$-$index($t_1$, ts) for some text segment ts in d.

Figure 3:
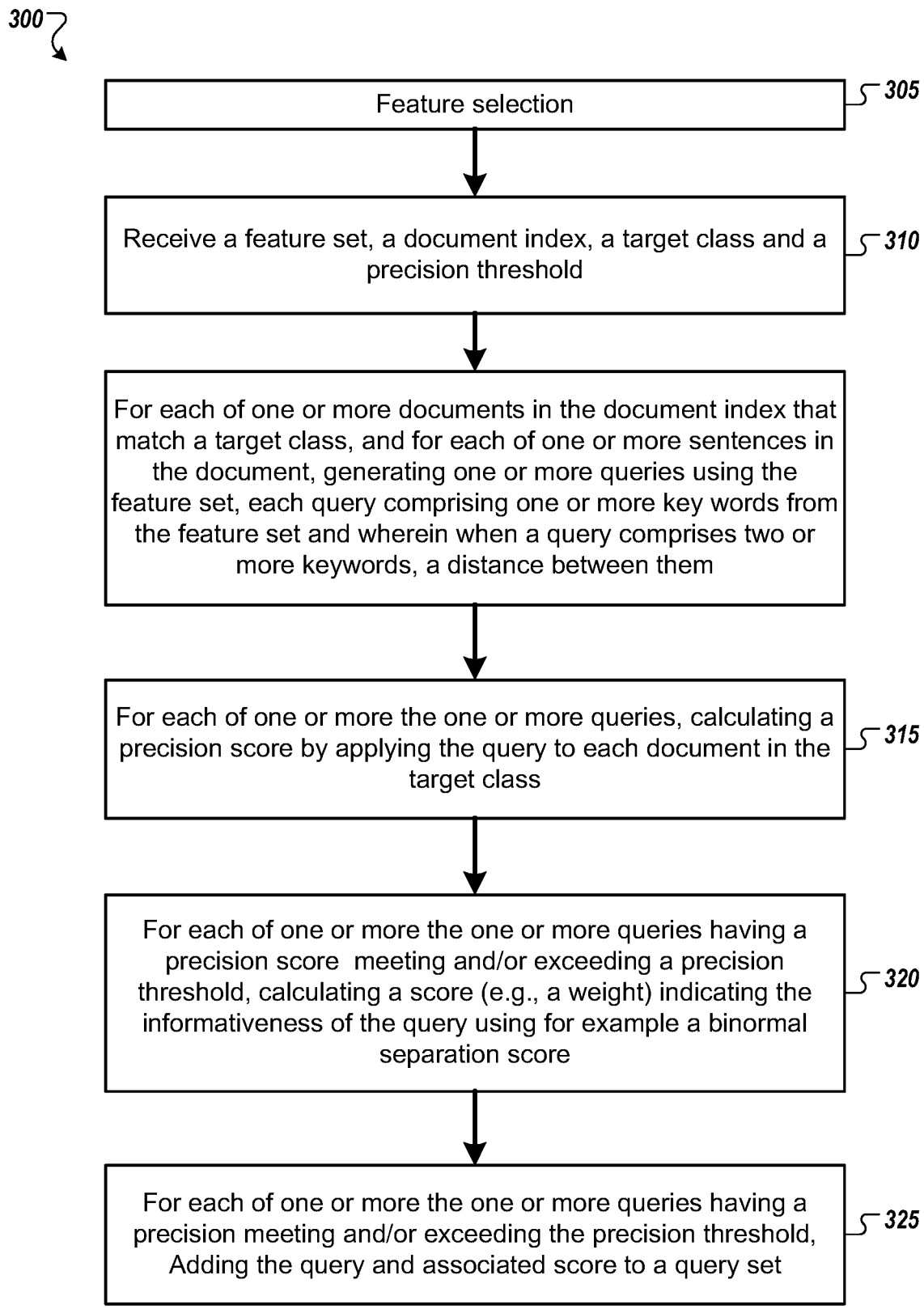
FIG. 3 is a flow diagram of an example method for generating queries for query set extraction in accordance with some embodiments discussed herein.

In embodiments, the system receives 210 a group of classifying queries that are used to identify a distinct label or category, and the classifying queries are used to classify the input document, as previously described with reference to FIG. 1. In some embodiments, the group of classifying queries can be generated automatically, for example, using method 300, a flow diagram of which is illustrated in FIG. 3. Method 300 is described in detail in U.S. patent application Ser. No. 13/893,044.

For each determining query in the group of determining queries generated from the document, in embodiments, the system determines 215, based in part on a query subsumption calculus, whether the determining query is subsumed by at least one of the classifying queries. In embodiments, determining queries generated from the new document 125 are checked for subsumption by the classifying queries to determine which, if any, classifying queries would have hit the document if the classifying queries were to be run over the document. In some embodiments, the document is classified as belonging to the particular category represented by the classifying queries if the number of hits of the classifying queries is above a categorization threshold value.

In some embodiments, a precision score (e.g., a binormal separation score (BNS)) is calculated for each classifying query based on the training data used to generate the set of classifying queries. In embodiments, a document can be assigned a categorization score that is calculated as a normalized sum of the precision scores of the classifying queries that hit the document, as described in U.S. patent application Ser. No. 13/893,044. The document categorization score can be compared to a categorization threshold value that was computed at training time through cross-validation and/or is based on test data, representing a score threshold that yields a minimum desired precision or is optimized for F-score.

Query subsumption, denoted by $\sqsupseteq_q$, defines a partial order over Q; $q_i \sqsupseteq_q q_j$ iff hit($q_i$)$\supseteq$hit($q_j$). Subsumption is reflexive and transitive, i.e., if $q_i \sqsupseteq_q q_j \sqsupseteq_q q_k$, then $q_i \sqsupseteq_q q_k$, and similarly $q_i \sqsupseteq_q q_i$ for all $q \in Q$.

The inverse of $\sqsupseteq_q$ is $\sqsubseteq_q$, i.e., $q_i \sqsubseteq_q q_j$ (i.e., $q_i$ is subsumed by $q_j$) iff hit($q_i$)$\subseteq$hit($q_j$).

Term subsumption, denoted by $\supseteq_t$, defines a partial order over T; for all $t, u \in T$, $t \supseteq_t u$ if $t_i \in u$ for all $t_i \in t$, and if $t_i$ precedes $t_j$ in t it also precedes it in u. Term subsumption is reflexive and transitive.

The inverse of $\supseteq_t$ is $\subseteq_t$.

In embodiments, given a document query $q_i$ and an existing classifying query set Q, the determination of whether there is subsumption is determining whether there exists a $q_j \in Q$ such that either $q_i \sqsubseteq_q q_j$ or $q_i \sqsupseteq_q q_j$. This determination will be discussed in more detail below with reference to FIG. 4.

In some embodiments, a mapping from the feature set F to the query set Q is created to establish term subsumption between $q_i$ and members of Q.

Term containment: Let queries: $F \rightarrow P(Q)$ be a one-to-many mapping from the feature set F to the powerset of Q such that for all terms t in F, queries($t$) := $\{q | q \in Q \wedge t \in \text{terms}(q)\}$ Term-subsuming queries of $q_i$ are queries tsg: $Q \rightarrow Q$ whose terms subsume the terms of $q_i$. We identify the term-subsuming queries of $q_i$ as follows:

$$tsg(q_i) := \bigcap_{k=1}^{n} \text{queries}(t_k^n)$$

Term-subsumed queries of $q_i$ are queries tsd: $Q \rightarrow Q$ whose terms are subsumed by the terms of $q_i$. We identify the term-subsumed queries of $q_i$ as follows:

$$tsd(q_i) := \left\{ q_j \,\middle|\, q_j \in \bigcup_{k=1}^{n} \text{queries}(t_k^n) \wedge \text{terms}(q_j) \subseteq_t \text{terms}(q_i) \right\}$$

In embodiments, the system updates 225 the group of classifying queries in an instance in which the classifying query is subsumed by the determining query 220. In some embodiments, updating the group of classifying queries includes adding the query to and removing the subsumed classifying query from the group of classifying queries. The process ends 230 once the group of classifying queries is updated.

In embodiments, the system does not update the group of classifying queries in an instance in which the query is subsumed by the classifying query 220, and the process ends 230.

FIG. 4 is a flow diagram of an example method 400 for determining whether a query subsumes a classifying query based in part on a query subsumption calculus. For convenience, the method 400 will be described with respect to a system that includes one or more computing devices and performs the method 400. Specifically, the method 400 will be described with respect to implementation by classifying queries updater within query subsumption system 100.

Common terms ct: $T \times T \rightarrow T$. Let t and u be two term arrays, and $t \subseteq_t u$. Then ct(t, u) is a new term array v such that for all $t_i \in v$, $t_i \in t$ and $t_i \in u$, and for all $t_i, t_j \in v$ if $t_i$ precedes $t_j$ then $t_i$ must also precede $t_j$ in t and u.

Leftmost common term $T \rightarrow F$: Let t, u be two term arrays, and $t \subseteq_t u$. Then the leftmost common term of t and u (lmct(t, u)) is the first element of ct(t, u).

Rightmost common term $T \rightarrow F$: Let t, u be two term arrays, and $t \subseteq_t u$. Then the leftmost common term of t and u (rmct(t, u)) is the last element of ct(t, u).

Omissions om: $T \times T \rightarrow T$. Let t and u be two term arrays, and $t \subseteq_t u$. Then om(t, u) is the term array $v''$ such that $v_i \notin t$ for all elements in $v''$, and for all $v_i, v_j \in v$ the relative order of $v_i$ and $v_j$ also holds in u.

Inner Omissions io: $T \times T \rightarrow T$. Let t and u be two term arrays, and $t \subseteq_t u$. Then io(t, u) is the term array $v''$ such that $v_i \notin t$ for all elements in $v''$, and the element corresponding to $v_1$ in u follows lmct(t, u), and the element corresponding to $v_n$ in u precedes rmct(t, u).

Outer Omissions oo: $T \times T \rightarrow T$. Let t and u be two term arrays, and $t \subseteq_t u$. Then oo(t, u) is the term array $v''$ such that $v_i \notin t$ for all elements in $v''$, and for all $v_i \in v$, the element corresponding to $v_1$ in u either precedes lmct(t, u), or it follows rmct(t, u).

Table 1 illustrates examples of term arrays with common terms and omissions.

TABLE 1

Examples of term arrays in which $t \subseteq_t u$.

t = (b, e)
u = (a, b, c, d, e, f)
lmct(t, u) = b
rmct(t, u) = e
io(t, u) = (c, d)
oo(t, u) = (a, f)

In embodiments, the system calculates 405 a first text span between a leftmost common term and a rightmost common term for the determining query, and calculates 410 a second text span between a leftmost common term and a rightmost common term for the classifying query.

In some embodiments, calculating a text span includes subtracting at least one outer omission from a query. For hit($q_i$) $\supseteq$ hit($q_j$) (the necessary and sufficient condition for query subsumption) to be true, $q_i$ must hit every document that $q_j$ hits. If gap($q_i$) < gap($q_j$) − |oo($q_i$, $q_j$)|, then $q_j$ can hit documents missed by $q_i$. This is because gap($q_i$) must be wide enough to allow for at least |io($q_i$, $q_j$)| elements between lmct($q_i$, $q_j$) and rmct($q_i$, $q_j$). Any smaller gap would mean that $q_i$ does not hit all the documents that $q_j$ may hit. The oo($q_i$, $q_j$) are irrelevant.

In embodiments, the system determines 420 that the classifying query is subsumed by the determining query in an instance in which the first text span is greater than or equal to the second text span. The system determines 425 that the determining query is subsumed by the classifying query in an instance in which the first text span is less than the second text span.

FIG. 5 shows a schematic block diagram of circuitry 500, some or all of which may be included in, for example, query subsumption system 100. As illustrated in FIG. 5, in accordance with some example embodiments, circuitry 500 can include various means, such as processor 502, memory 504, communications module 506, and/or input/output module 508. As referred to herein, "module" includes hardware, software and/or firmware configured to perform one or more particular functions. In this regard, the means of circuitry 500 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 504) that is executable by a suitably configured processing device (e.g., processor 502), or some combination thereof.

Processor 502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 502 comprises a plurality of processors. The plurality of processors may be embodied on a single computing device or may be distributed across a plurality of computing devices collectively configured to function as circuitry 500. The plurality of processors may be in operative communication with each other and may be collectively configured to perform one or more functionalities of circuitry 500 as described herein. In an example embodiment, processor 502 is configured to execute instructions stored in memory 504 or otherwise accessible to processor 502. These instructions, when executed by processor 502, may cause circuitry 500 to perform one or more of the functionalities of circuitry 500 as described herein.

Whether configured by hardware, firmware/software methods, or by a combination thereof, processor 502 may comprise an entity capable of performing operations according to embodiments of the present invention while configured accordingly. Thus, for example, when processor 502 is embodied as an ASIC, FPGA or the like, processor 502 may comprise specifically configured hardware for conducting one or more operations described herein. Alternatively, as another example, when processor 502 is embodied as an executor of instructions, such as may be stored in memory 504, the instructions may specifically configure processor 502 to perform one or more algorithms and operations described herein, such as those discussed in connection with FIGS. 2-4.

Memory 504 may comprise, for example, volatile memory, non-volatile memory, or some combination thereof. Although illustrated in FIG. 5 as a single memory, memory 504 may comprise a plurality of memory components. The plurality of memory components may be embodied on a single computing device or distributed across a plurality of computing devices. In various embodiments, memory 504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 504 may be configured to store information, data (including analytics data), applications, instructions, or the like for enabling circuitry 500 to carry out various functions in accordance with example embodiments of the present invention. For example, in at least some embodiments, memory 504 is configured to buffer input data for processing by processor 502. Additionally or alternatively, in at least some embodiments, memory 504 is configured to store program instructions for execution by processor 502. Memory 504 may store information in the form of static and/or dynamic information. This stored information may be stored and/or used by circuitry 500 during the course of performing its functionalities.

Communications module 506 may be embodied as any device or means embodied in circuitry, hardware, a computer program product comprising computer readable program instructions stored on a computer readable medium (e.g., memory 504) and executed by a processing device (e.g., processor 502), or a combination thereof that is configured to receive and/or transmit data from/to another device, such as, for example, a second circuitry 500 and/or the like. In some embodiments, communications module 506 (like other components discussed herein) can be at least partially embodied as or otherwise controlled by processor 502. In this regard, communications module 506 may be in communication with processor 502, such as via a bus. Communications module 506 may include, for example, an antenna, a transmitter, a receiver, a transceiver, network interface card and/or supporting hardware and/or firmware/software for enabling communications with another computing device. Communications module 506 may be configured to receive and/or transmit any data that may be stored by memory 504 using any protocol that may be used for communications between computing devices. Communications module 506 may additionally or alternatively be in communication with the memory 504, input/output module 508 and/or any other component of circuitry 500, such as via a bus.

Input/output module 508 may be in communication with processor 502 to receive an indication of a user input and/or to provide an audible, visual, mechanical, or other output to a user. Some example visual outputs that may be provided to a user by circuitry 500 are discussed in connection with FIG. 1. As such, input/output module 508 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 500 is embodied as a server or database, aspects of input/output module 508 may be reduced as compared to embodiments where circuitry 500 is implemented as an end-user machine or other type of device designed for complex user interactions. In some embodiments (like other components discussed herein), input/output module 508 may even be eliminated from circuitry 500. Alternatively, such as in embodiments wherein circuitry 500 is embodied as a server or database, at least some aspects of input/output module 508 may be embodied on an apparatus used by a user that is in communication with circuitry 500, such as for example, pharmacy terminal 108. Input/output module 508 may be in communication with the memory 504, communications module 506, and/or any other component(s), such as via a bus. Although more than one input/output module and/or other component can be included in circuitry 500, only one is shown in FIG. 5 to avoid overcomplicating the drawing (like the other components discussed herein).

Query subsumption module 510 may also or instead be included and configured to perform the functionality discussed herein related to the generating an optimal classifying query set for categorizing and/or labeling textual data based on a query subsumption calculus discussed above. In some embodiments, some or all of the functionality of determining query subsumption may be performed by processor 502. In this regard, the example processes and algorithms discussed herein can be performed by at least one processor 502 and/or query subsumption module 510. For example, non-transitory computer readable media can be configured to store firmware, one or more application programs, and/or other software, which include instructions and other computer-readable program code portions that can be executed to control each processor (e.g., processor 502 and/or query subsumption module 510) of the components of system 500 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of query subsumption system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 502 and/or query subsumption module 510 discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 504) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system, comprising one or more computers and one or more storage devices storing instructions that are operable, when executed by the one or more computers, to cause the one or more computers to:
   identify a classifying queries subset associated with document text within a document, wherein the classifying queries subset is a subset of a classifying queries group representing a particular category for the document text;
   calculate a document categorization score based on a normalized sum of respective performance metrics for respective classifying queries of the classifying queries subset, wherein at least a portion of the respective performance metrics comprises a binormal separation score that represents a degree of separation between a first classifying query representing the particular category and a second classifying query representing a different category; and
   associate the document with the particular category represented by the classifying queries group in an instance in which the document categorization score is greater than a categorization threshold value.

2. The system of claim 1, wherein each classifying query of the classifying queries subset subsumes at least one query associated with at least one term identified within the document text.

3. The system of claim 1, wherein the one or more storage devices store instructions that are operable, when executed by the one or more computers, to further cause the one or more computers to:
   generate a determining queries group for the document text within a document, wherein each determining query within the determining queries group includes at least one term identified within the document text.

4. The system of claim 3, wherein the one or more storage devices store instructions that are operable, when executed by the one or more computers, to further cause the one or more computers to:
   update the classifying queries group in an instance in which a classifying query of the classifying queries subset is subsumed by a determining query of the determining queries group.

5. The system of claim 3, wherein the one or more storage devices store instructions that are operable, when executed by the one or more computers, to further cause the one or more computers to:
   update the classifying queries group in response to a determination that a classifying query of the classifying queries subset and a determining query of the determining queries group share at least two common terms.

6. The system of claim 3, wherein the one or more storage devices store instructions that are operable, when executed by the one or more computers, to further cause the one or more computers to:
   add a determining query of the determining queries group to the classifying queries group in response to a determination that a classifying query of the classifying queries subset is subsumed by the determining query.

7. The system of claim 3, wherein the one or more storage devices store instructions that are operable, when executed by the one or more computers, to further cause the one or more computers to:

remove a classifying query from the classifying queries subset in response to a determination that the classifying query is subsumed by a determining query of the determining queries group.

8. A computer-implemented method, comprising:
identifying, by a computing device comprising a processor, a classifying queries subset associated with document text within a document, wherein the classifying queries subset is a subset of a classifying queries group representing a particular category for the document text;
calculating, by the computing device, a document categorization score based on a normalized sum of respective performance metrics for respective classifying queries of the classifying queries subset, at least a portion of the respective performance metrics comprising a binormal separation score that represents a degree of separation between a first classifying query representing the particular category and a second classifying query representing a different category; and
associating, by the computing device, the document with the particular category represented by the classifying queries group in an instance in which the document categorization score is greater than a categorization threshold value.

9. The computer-implemented method of claim 8, wherein the identifying the classifying queries subset comprises determining that a classifying query of the classifying queries subset subsumes at least one query associated with at least one term identified within the document text.

10. The computer-implemented method of claim 8, further comprising:
generating, by the computing device, a determining queries group for the document text within a document, wherein each determining query within the determining queries group includes at least one term identified within the document text.

11. The computer-implemented method of claim 10, further comprising:
updating, by the computing device, the classifying queries group in an instance in which a classifying query of the classifying queries subset is subsumed by a determining query of the determining queries group.

12. The computer-implemented method of claim 10, further comprising:
updating, by the computing device, the classifying queries group in response to a determination that a classifying query of the classifying queries subset and a determining query of the determining queries group share at least two common terms.

13. The computer-implemented method of claim 10, further comprising:
adding, by the computing device, a determining query of the determining queries group to the classifying queries group in response to a determination that a classifying query of the classifying queries subset is subsumed by the determining query.

14. The computer-implemented method of claim 10, further comprising:
removing, by the computing device, a classifying query from the classifying queries subset in response to a determination that the classifying query is subsumed by a determining query of the determining queries group.

15. A computer program product, stored on a computer readable medium, comprising instructions that when executed by one or more computers cause the one or more computers to:
identify a classifying queries subset associated with document text within a document, wherein the classifying queries subset is a subset of a classifying queries group representing a particular category for the document text;
calculate a document categorization score based on a normalized sum of respective performance metrics for respective classifying queries of the classifying queries subset, wherein at least a portion of the respective performance metrics comprises a binormal separation score that represents a degree of separation between a first classifying query representing the particular category and a second classifying query representing a different category; and
associate the document with the particular category represented by the classifying queries group in an instance in which the document categorization score is greater than a categorization threshold value.

16. The computer program product of claim 15, further comprising instructions that when executed by the one or more computers cause the one or more computers to:
generate a determining queries group for the document text within a document, wherein each determining query within the determining queries group includes at least one term identified within the document text.

17. The computer program product of claim 15, further comprising instructions that when executed by the one or more computers cause the one or more computers to:
update the classifying queries group in an instance in which a classifying query of the classifying queries subset is subsumed by a determining query of the determining queries group.

18. The computer program product of claim 17, further comprising instructions that when executed by the one or more computers cause the one or more computers to:
update the classifying queries group in response to a determination that a classifying query of the classifying queries subset and a determining query of the determining queries group share at least two common terms.

19. The computer program product of claim 17, further comprising instructions that when executed by the one or more computers cause the one or more computers to:
add a determining query of the determining queries group to the classifying queries group in response to a determination that a classifying query of the classifying queries subset is subsumed by the determining query.

20. The computer program product of claim 17, further comprising instructions that when executed by the one or more computers cause the one or more computers to:
remove a classifying query from the classifying queries subset in response to a determination that the classifying query is subsumed by a determining query of the determining queries group.

* * * * *